(12) United States Patent
Watanabe et al.

(10) Patent No.: US 7,401,296 B2
(45) Date of Patent: Jul. 15, 2008

(54) INFORMATION PROCESSING TERMINAL DISPLAYING GUIDANCE FOR A KEY OPERATION ON A STANDBY-SCREEN

(75) Inventors: Yoshikazu Watanabe, Kawasaki (JP); Ken Hayashida, Kawasaki (JP); Yoko Fujii, Kawasaki (JP); Keizo Ito, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 450 days.

(21) Appl. No.: 10/359,657

(22) Filed: Feb. 7, 2003

(65) Prior Publication Data

US 2004/0021703 A1 Feb. 5, 2004

(30) Foreign Application Priority Data

Jul. 30, 2002 (JP) ............................. 2002-221531

(51) Int. Cl.
G06F 3/00 (2006.01)
G06F 9/00 (2006.01)
G06F 17/00 (2006.01)

(52) U.S. Cl. ................. 715/763; 715/762; 715/864; 715/705

(58) Field of Classification Search ............... 715/864, 715/762, 763, 64, 705, 764
See application file for complete search history.

(56) References Cited

U.S. PATENT DOCUMENTS

| 5,128,672 A * | 7/1992 | Kaehler ................. 341/23 |
| 6,310,634 B1 * | 10/2001 | Bodnar et al. ........... 715/854 |
| 6,421,545 B1 * | 7/2002 | Christal ................. 455/566 |
| 6,791,577 B2 * | 9/2004 | Yoshioka ............... 715/705 |
| 2002/0055793 A1 * | 5/2002 | Yoshioka ................. 700/83 |
| 2003/0222898 A1 * | 12/2003 | Macomber et al. ....... 345/709 |

FOREIGN PATENT DOCUMENTS

| JP | 10-023117 | 1/1998 |
| JP | 2000-078252 | 3/2000 |
| JP | 2000-091940 | 3/2000 |
| JP | 2000-115345 | 4/2000 |
| JP | 2001-345913 | 12/2001 |
| JP | 2002-186029 | 6/2002 |

OTHER PUBLICATIONS

Notice of Reason for Rejection, mailed May 29, 2007 in corresponding Japanese application 2002-221531.

* cited by examiner

*Primary Examiner*—Tadesse Hailu
*Assistant Examiner*—Anita D Chaudhuri
(74) *Attorney, Agent, or Firm*—Staas & Halsey LLP (57) ABSTRACT

A cellular phone and a guidance display program enable an enhancement of operability when operating the cellular phone, corresponding to an event. An occurrence of an event is detected, guidance information corresponding to the event is searched out of a guidance storage unit. A standby-image corresponding to the guidance information is generated and then displayed, and guidance is displayed in the standby-image. When accepting an operation displayed in the guidance, a process corresponding to the event is executed.

10 Claims, 8 Drawing Sheets

| EVENT | CHANRACTER INFORMATION | POSITIONAL INFORMATION | KEY IMAGE |
|---|---|---|---|
| RECEIPT OF MAIL | [MAIL IS RECEIVED] | UPPER KEY | |
| RECEIPT OF MESSAGE | [MESSAGE IS LEFT] | LEFT KEY | |
| CALL RECEIVING | [CALL IS RECEIVED] | LOWER KEY | |
| ALARM | [ALARMING] | LEFT UPPER KEY | MENU |
| To Do | [To-Do MADE] | LEFT LOWER KEY | |
| ⋮ | ⋮ | ⋮ | ⋮ |

INFORMATION PROCESSING TERMINAL DISPLAYING GUIDANCE FOR A KEY OPERATION ON A STANDBY-SCREEN

BACKGROUND OF THE INVENTION

The present invention relates to a technology of displaying guidance for a key operation etc on a standby-screen of an information processing terminal.

The category of the information processing terminals according to the present invention includes a cellular phone, a PHS (Personal Handy phone System), a PDA (Personal Digital Assistant), a PC (Personal computer) and so on.

Up-to-date various kinds of devices such as the cellular phone or the PDA are utilized as the information processing terminal.

The information processing terminals implement a multiplicity of functions such as management of schedule, access the Web, and a communication (a call). Utilization of these functions involves selecting and executing a target function by manipulating an operation key.

For example, in a cellular phone, a dialing function of a telephone number, a function of delivering and receiving an e-mail and a function of hearing an answering recording are executed by pressing keys assigned these functions and selecting a selection menu displayed as an option of each function by use of a menu key.

The cellular phone or the PDA is limited in terms of the number of implementations of keys assigned the respective functions and the menu key in order to design the cellular phone in a portable size.

Therefore, a contrivance is that a larger number of keys are laid out by downsizing each key to the greatest possible degree, and a plurality of functions are assigned to one single key.

Particularly as the cellular phone has come to have highly sophisticated functions over the recent years, this tendency becomes more conspicuous.

If the multiplicity of small keys are laid out as described above, however, an area for displaying each key function naturally narrows, with the result that a user might feel it difficult to recognize which function each key corresponds to. Especially in this case, fresh users and aged users are hard to manipulate the keys, and this is not preferable in terms of promoting the universal design.

Further, if the plurality of functions are assigned to one single key, the user needs an operation for selecting which function among the plurality of function after pressing this key, and therefor a problem is that the operation becomes complicated enough not to recognize.

For example, on a general type of cellular phone, when receiving the e-mail during a standby status, a piece of guidance [a mail is received] is displayed on a standby-screen.

This guidance enables the user to know that the mail has been received. There arises, however, a problem that the way of indicating which operation the user performs next for reading this mail can not be known from such a display.

SUMMARY OF THE INVENTION

It is a primary object of the present invention, which was devised to obviate the problems inherent in the prior art described above, to provide a technology capable of enhancing operability when operating a cellular phone, corresponding to an event.

To accomplish this object, in a cellular phone and a guidance display program according to the present invention, an occurrence of an event is detected, guidance information corresponding to the event is searched out of a guidance storage unit. A standby-image corresponding to the guidance information is generated and then displayed, and guidance is displayed in the standby-image.

With this scheme, when the event occurs during a standby status, an operation conducted next corresponding to this event is displayed on the standby-screen, then becomes easy for every user to understand and can be conducted in intuition, thereby improving the operability.

According to one aspect of the present invention, a cellular phone has an event detection unit detecting an occurrence of an event, a guidance storage unit stored with pieces of guidance information corresponding to respective events, a guidance search unit searching out the guidance information corresponding to the event from the guidance storage unit, an image generation unit generating a standby-image corresponding to the guidance information, and a display control unit displaying the standby-image.

The cellular phone may further have an operation accept unit accepting an operation displayed in the guidance, and a process executing unit executing a process corresponding to the event when accepting the operation.

The cellular phone may further have an assignment change unit changing a function assigned to an operation key in the case of displaying the guidance, wherein the guidance search unit may search out the guidance information indicating an operation of the operation key after changing the function.

In the cellular phone, the guidance information may contain an image of the operation key operated corresponding to the event.

According to another aspect of the present invention, a guidance display program running on a cellular phone, includes detecting an occurrence of an event, searching out guidance information corresponding to the event from a guidance storage unit, generating a standby-image corresponding to the guidance information, and displaying the standby-image, whereby the guidance is displayed in the standby-image.

Further, the guidance display program may further include accepting an operation displayed in the guidance, and executing a process corresponding to the event when accepting the operation.

Moreover, the guidance display program may further include changing a function assigned to an operation key in the case of displaying the guidance, wherein the above search-out involves searching out the guidance information indicating an operation of the operation key after changing the function.

In the guidance display program, the guidance information may contain an image of the operation key operated corresponding to the event.

According to still another aspect of the present invention, a cellular phone guidance display method executed by a cellular phone, includes detecting an occurrence of an event, searching out guidance information corresponding to the event from a guidance storage unit, generating a standby-image corresponding to the guidance information, and displaying the standby-image, whereby the guidance is displayed in the standby-image.

The cellular phone guidance display method may further include accepting an operation displayed in the guidance, and executing a process corresponding to the event when accepting the operation.

The cellular phone guidance display method may further include changing a function assigned to an operation key in the case of displaying the guidance, wherein the search-out involves searching out the guidance information indicating an operation of the operation key after changing the function.

In the cellular phone guidance display method, the guidance information may contain an image of the operation key operated corresponding to the event.

According to a further aspect of the present invention, there may be provided a recording medium recorded with the guidance display program executed by a computer to display the guidance. The program on this recording medium is read and executed by the computer, whereby functions thereof can be provided.

Herein, the readable-by-computer recording medium includes recording mediums capable of storing information such as data, programs, etc. magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

According to the present invention, the architectures described above can be combined to the greatest possible degree.

BRIEF DESCRIPTION OF THE DRAWINGS

FIGS. 8(*a*) through 8(*d*) are explanatory diagrams showing how a standby-image is generated.

DETAILED DESCRIPTION OF THE PREFERRED EMBODIMENT

A cellular phone as An information processing terminal in an embodiment 1 of the present invention will hereinafter be described with reference to FIGS. 1 through 7.

§1. Whole Architecture

Figure 1:
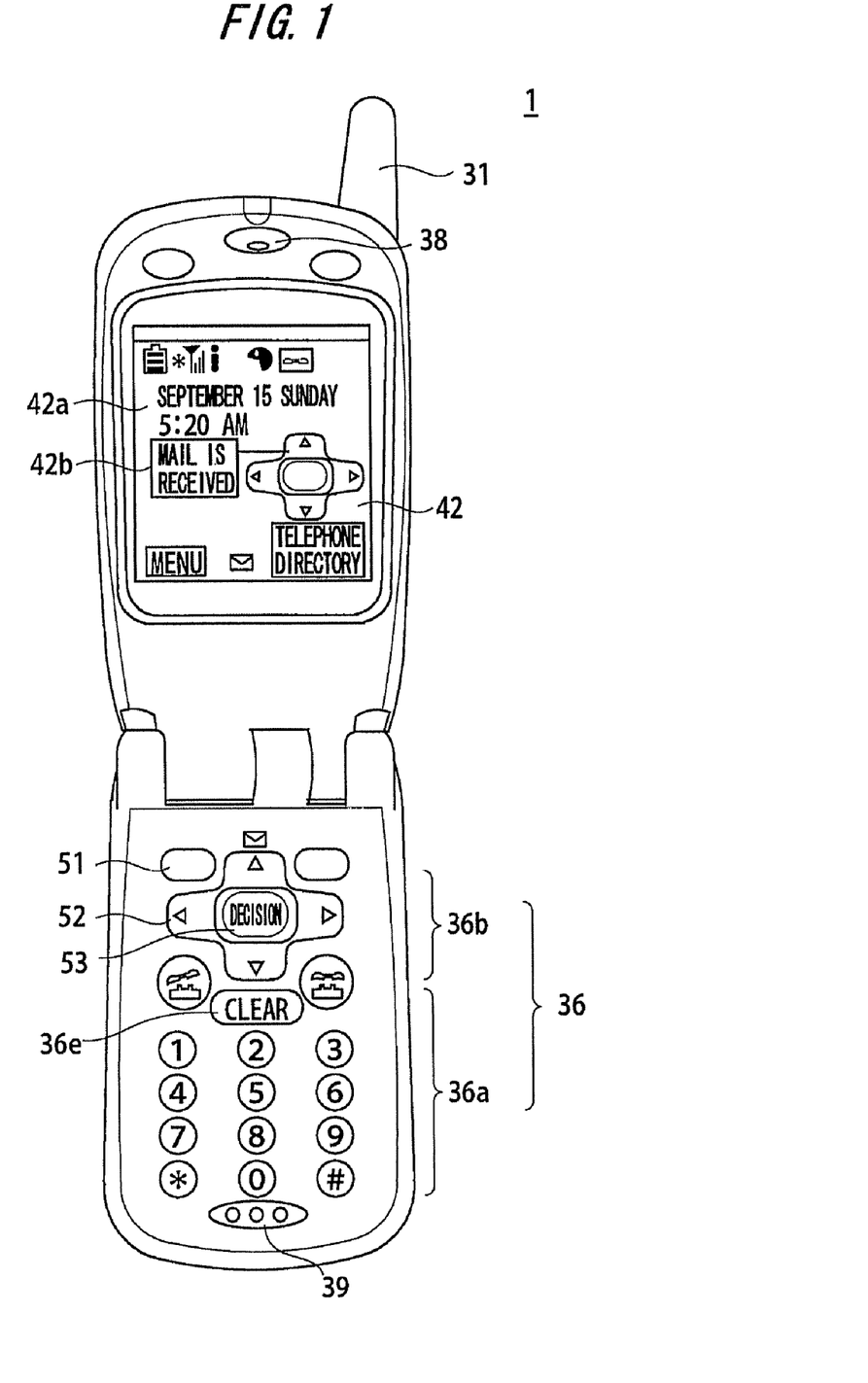
FIG. 1 is an explanatory view showing a cellular phone of the present invention.

FIG. 1 is a view illustrating an example of a guidance display on the cellular phone in the embodiment 1.

A cellular phone 1, if there occurs an event such as receiving a mail, a message, a phone call (call receiving) and so on when in a standby status, searches out guidance information indicating an operation corresponding to this event, and displays guidance on the standby-screen on the basis of this piece of guidance information.

According to the embodiment 1, as shown in FIG. 1, a design of operation keys is displayed as it is on the standby-screen, and the operations are illustrated, thereby enabling intuitive operations to be performed.

§2. Architecture of Cellular Phone

Figure 2:
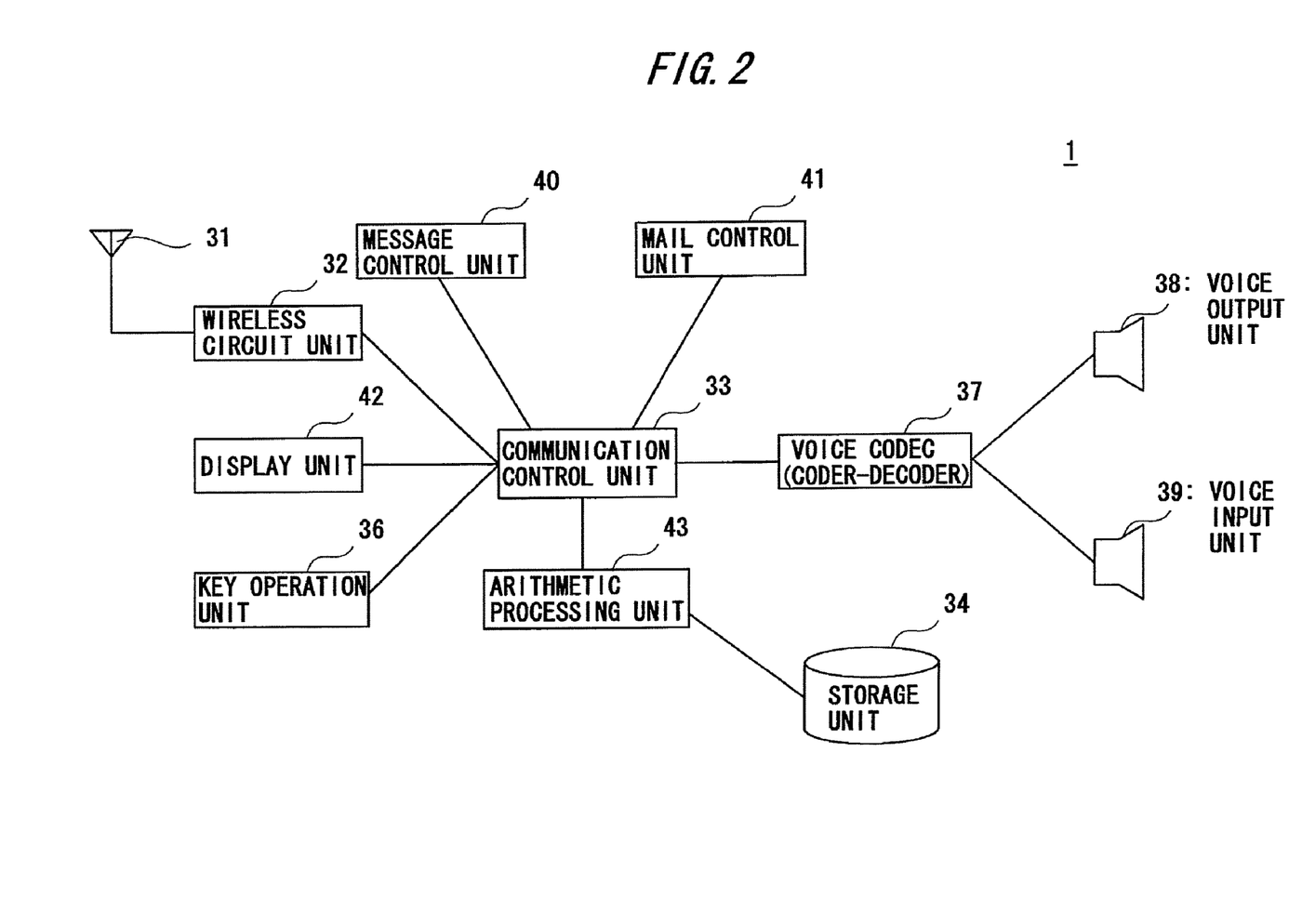
FIG. 2 is a block diagram of the cellular phone of the present invention.

Next, an architecture of the cellular phone in the embodiment 1 will be explained. FIG. 2 is a block diagram of the cellular phone according to the present invention.

As shown in FIG. 2, the cellular phone 1 in the embodiment 1 includes an antenna 31, a wireless circuit unit 32, a communication control unit 33, a storage unit 34, a key operation unit 36, a voice CODEC (coder-decoder) 37, a voice output unit (a speech receiving unit) 38, a voice input unit (a speech sending unit) 39, a message control unit 40, a mail control unit 41, a display unit 42 and an arithmetic processing unit 43.

The antenna 31 is used for transmitting and receiving radio waves when performing communications with a radio base station (unillustrated). The wireless circuit unit 32 generates receiving data by demodulating the radio waves received by the antenna 31, then modulates transmitting data into a predetermined frequency, and outputs the modulated signals via the antenna 31.

The communication control unit 33 performs control of decoding the demodulated signals generated by the wireless circuit unit 32, outputting the coded transmitting data to the wireless circuit unit 32, and thus having the communications performed, and so forth.

The storage unit 34 is constructed of a flash memory, an SRAM (Static Random Access Memory), an NVRAM (Non-volatile Random Access Memory) etc., and is stored with phone number data, data of mails delivered and received, data of messages, an application program and so on. Further, the storage unit 34 is stored with pieces of guidance information which will be explained later on in away that makes them corresponding to events, and also functions as a guidance storage unit.

The key operation unit 36 is constructed of operation keys 36*a* for inputting the phone numbers and characters, operation keys 36*b* for selecting selection menus, and so forth. The key operation unit 36 may involve the use of input dials (rotating dials), a touch panel, etc in addition to the operations keys described above.

The voice CODEC 37, after receiving the voice data decoded by the communication control unit 33 and decoding the same data in specifications based on a voice coding system, executes an analog conversion thereof and outputs the thus converted data as voice signals to the voice output unit 38. Further, the voice CODEC 37, after executing a digital conversion of the voice signals inputted from the voice input unit 39, encodes the thus converted signals in the specifications based on the voice coding system and outputs them as voice data to the communication control unit 33.

The voice output unit 38 is constructed of a loudspeaker and an amplifier, and outputs the voice signals as a voice. The voice input unit 39 is constructed of a microphone and an amplifier, and inputs a voice of a speaker as voice signals described above.

The message control unit 40, if a user does not respond to a phone call, answers in voice such as [Try to record a message after the feep], thus prompting the caller to input the message. Then, when the message is inputted, the message control unit 40 stores this message on the storage unit 34.

The mail control unit 41 receives the mail data decoded by the communication control unit 33, then decodes the mail data in predetermined specification, and stores the thus decoded data on the storage unit 34. Further, the mail control unit 41 generates the mail data based on an input from the key operation unit 36 and outputs the mail data to the communication control unit 33. The mail data outputted therefrom are coded by the communication control unit and transmitted by the wireless circuit unit 32, thereby delivering an e-mail to a terminal as the other communication party via the radio base station. Moreover, the mail control unit 41 reads the received mail data from the storage unit 34, and displays a content of the mail on the display unit 42.

The display unit 42 is constructed of an LCD (Liquid Crystal Display), an EL (electroluminescent) display etc., and displays the phone number, the content of the mail, a standby-image and so on.

The arithmetic processing unit 43 is constructed of a CPU (central Processing unit), a main memory etc. The arithmetic processing unit 43 executes arithmetic processes based on the information given from the respective units and the application software, thereby actualizing functions of an event detection unit, a guidance search unit, an image generation unit, a display control unit, an operation accept unit, a process executing unit, an assignment change unit and so on.

The arithmetic processing unit 43, as the function of the vent detection unit, receives the data decoded by the communication control unit 33, thereby detecting an occurrence of the event.

Further, the arithmetic processing unit 43, as the function of the guidance search unit, searches out apiece of guidance information corresponding to the event from the storage unit 34 (precisely from the guidance storage unit).

The arithmetic processing unit 43, as the function of the image generation unit, generates a standby-image corresponding to the guidance information.

The arithmetic processing unit 43, as the function of the display control unit, makes the display unit 42 displays the standby-image generated by the image generation unit.

The arithmetic processing unit 43, as the function of the operation accept unit, accepts the operation displayed in the guidance.

The arithmetic processing unit 43, as the function of the process executing unit, executes a process corresponding to the event when accepting the operation described above.

Moreover, the arithmetic processing unit 43, as the function of the assignment change unit, changes a function assigned to the operation key when accepting the event described above.

The embodiment 1 has, as discussed above, such a scheme that the arithmetic processing unit 43 executes the functions of the respective units based on the software, however, these units may also be configured by electronic circuits (hardware) that executes those functions.

§3. Guidance Display Method in Cellular Phone

A guidance display method in the cellular phone described above will be explained referring to FIG. 3.

Figure 3:
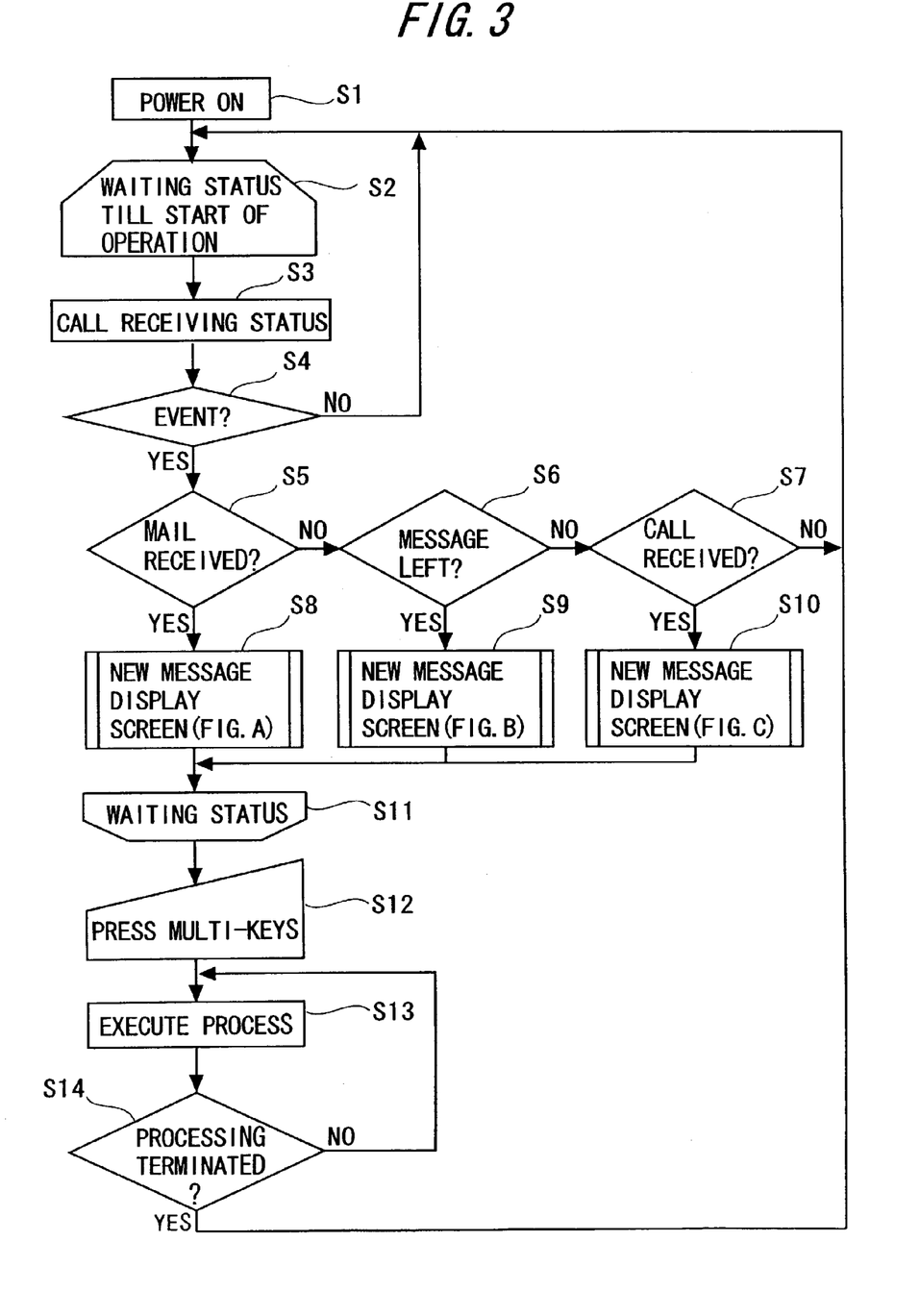
FIG. 3 is an explanatory flowchart showing a guidance display method.

The cellular phone 1, when its power source is switched ON (step 1: "step" used in the following discussion will be abbreviated to "S" such as S1), is kept in a standby status till an operation through the key operation unit 36 is started (S2).

The cellular phone 1 comes to a call receiving status when receiving the radio waves from the wireless base station, and these radio waves are demodulated by the wireless circuit unit 32 and decoded by the communication control unit 33 (S3).

The cellular phone 1, as the function of the event detection unit, judges whether the data decoded by the communication control unit 33 contain an event or not (S4).

Then, the cellular phone 1, if the event is contained therein, as the function of the event detection unit, judges a category of the event (S5 through S7). In the embodiment 1, the cellular phone 1 judges at first whether a mail is received or not (S5). Herein, if the mail is not received, the cellular phone 1 judges whether there is a message or not (S6). Further, if there is no input of the message, the cellular phone 1 judges whether a phone call is received (call receiving) or not (S7). If not the call receiving, the processing loops back to S2.

Whereas if it is judged in S5 that the mail is received, the cellular phone 1, as the function of the guidance search unit, searches out a piece of guidance information corresponding to the receipt of the mail from the storage unit 34. Then, the cellular phone 1 generates standby-image information based on the guidance information searched out and, as the function of the display control unit, displays the standby-image on the display unit 42. Namely, as shown in FIG. 1, the cellular phone 1 displays guidance [the mail is received] (S8).

Figure 4:
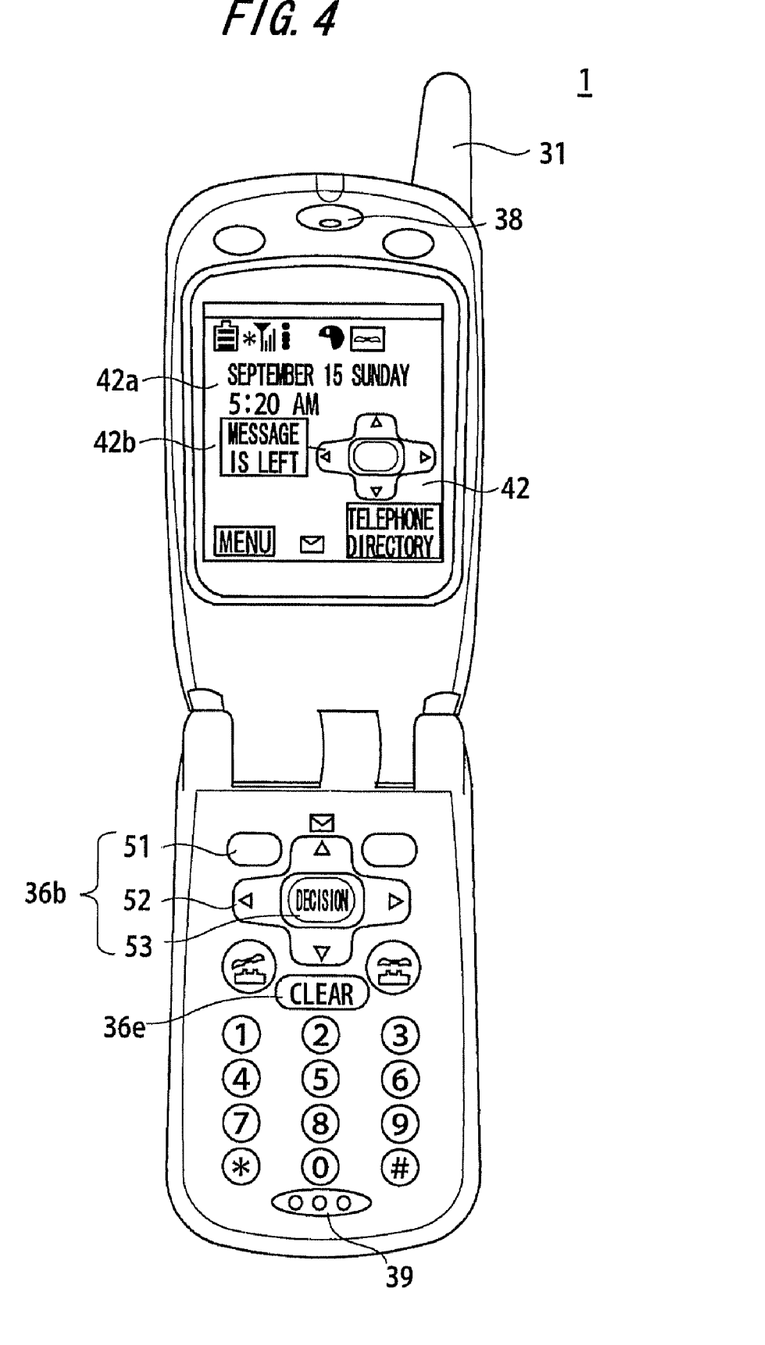
FIG. 4 is a view showing an example of a guidance display on the cellular phone.
Figure 5:
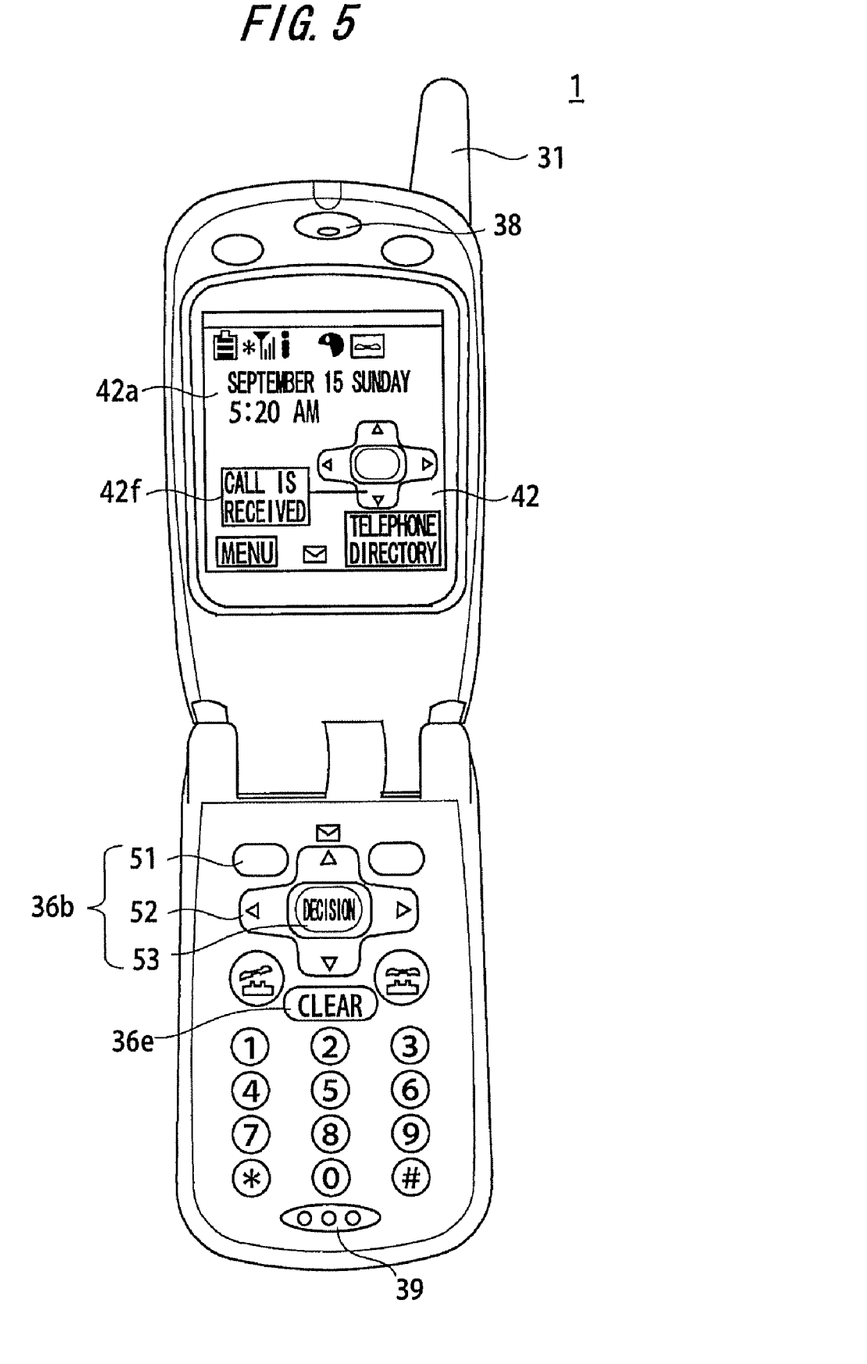
FIG. 5 is a view showing an example of the guidance display on the cellular phone.

Similarly, when judging in S6 that there is the message, the cellular phone 1, as shown in FIG. 4, displays guidance [the message is left] 42*b*(S9). Further, when judging in S7 that the call is received, the cellular phone 1, as shown in FIG. 5, displays guidance [the call is received] 42*f*(S10).

Thereafter, the cellular phone 1 returns to the standby status (S11) and repeats this loop of processes (S2 through S11) till a user's event is started.

Figure 6:
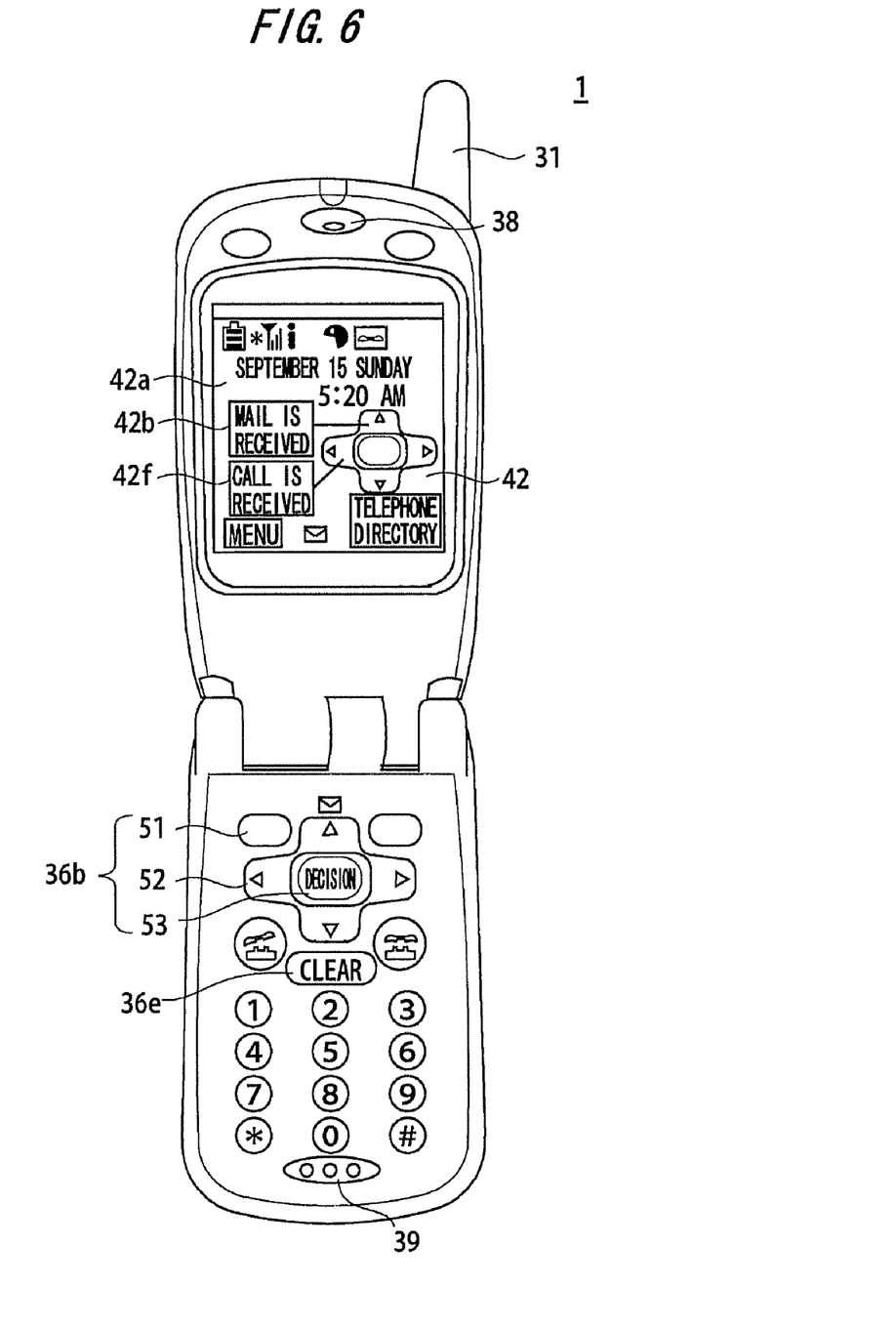
FIG. 6 is a view showing an example of the guidance display on the cellular phone.

As a result, if a plurality of events occur till the operation starts, plural pieces of guidance corresponding thereto are displayed. For example, if the message is received after receiving the mail, as shown in FIG. 6, the guidance [the mail is received] 42*b* and the guidance [the message is left] 42*f* are displayed together.

Further, when performing this mode of guidance display, the cellular phone 1 changes a key assignment so that the operation corresponding to the event can be conducted by one-touch operation.

For example, in the case of displaying a content of the mail at a normal time, a selection menu (unillustrated) is displayed by pressing a menu key 51, a "mail" is selected from this menu by pressing multi-keys 52, and a decision key 53 is pressed. By contrast, on the occasion of displaying the guidance [the mail is received] on the standby-screen, a function assignment of the multi-keys 52 is changed so that the content of the mail is displayed when pressing an upper key of the multi-keys 52. Further, the assignment is changed in the same way with respect to receiving the message and the call so that a process corresponding to a left or lower key of the multi-keys 52 is executed when pressing this left or lower key.

Then, in a case where the user having confirmed this guidance display performs an operation of pressing the key indicated by this guidance, the cellular phone 1, as the function of the operation accept unit, accepts this operation (S12) and, as the function of the process executing unit, executes a process corresponding to this event (S13).

Namely, if the event is a receipt of the mail, the cellular phone 1 displays this mail on the display unit 42, then reproduces the message if the event is a receipt of the message, and, if the event is a receipt of the call, displays a call receiving history.

When terminating this process, the cellular phone 1 returns to the standby status (S14).

As discussed above, the cellular phone 1 in the embodiment 1 displays the guidance illustrating the key that is to be manipulated next corresponding to the event. With this scheme, the operation becomes easy for every user to understand and can be conducted in intuition, thereby improving the operability.

Further, according to the embodiment 1, the key assignment is changed when displaying the guidance, whereby even the function normally executed by manipulating the plurality of keys can be executed by one-touch operation.

Modified Example

The embodiment 1 has exemplified the case where the standby-image is generated in a way that uses the as-stored image as the guidance information. the embodiment of the present invention is not, however, limited to this exemplification, there may be a scheme, wherein the images of the operation keys and the character information are separately stored as pieces of guidance information, and a standby-image is generated by combining the key image and the character information.

Figure 7:
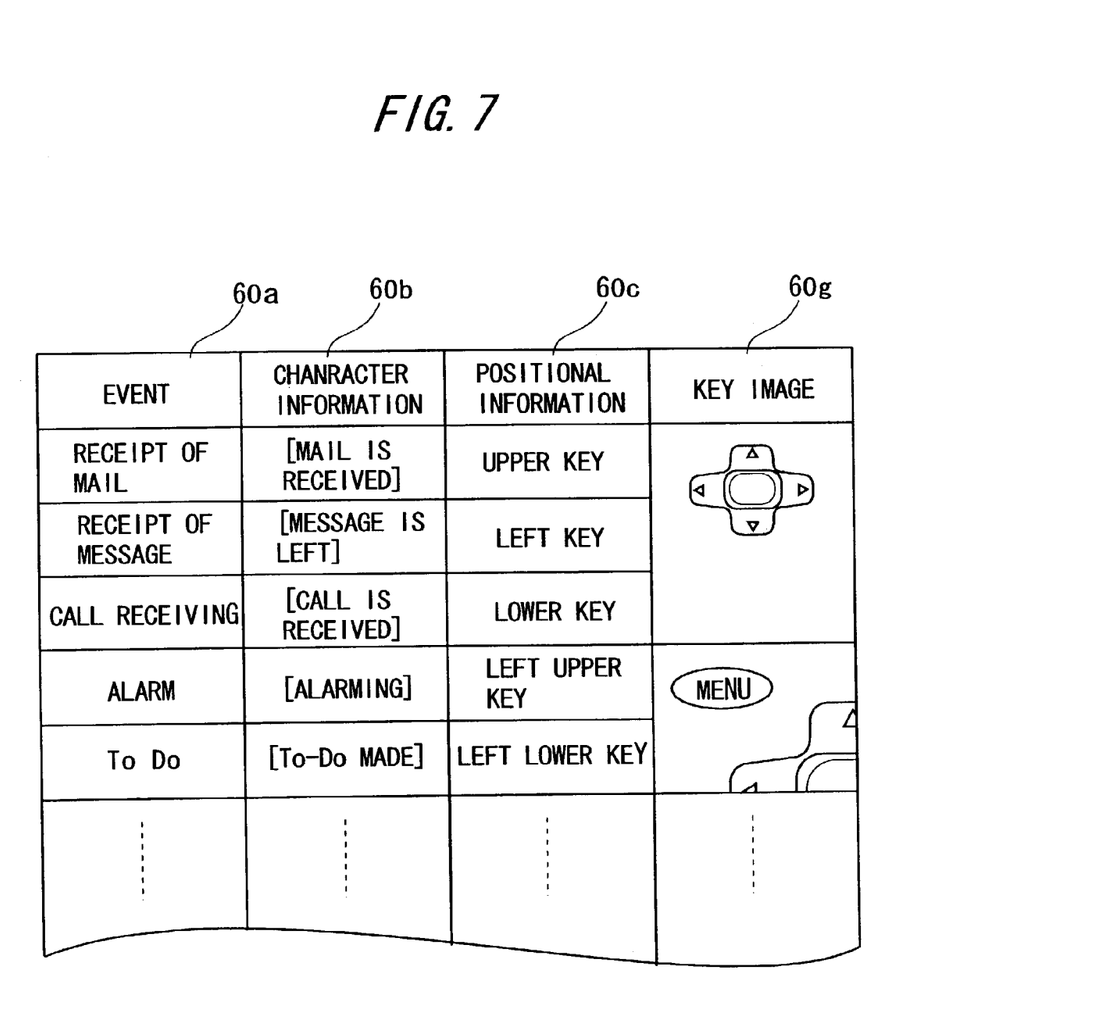
FIG. 7 is a diagram showing a data structure of guidance information in a modified example.

For instance, as shown in FIG. 7, a key image 60g, character information 60b and positional information 60c are stored corresponding to each event 60a in different fields.

In S8 through S10, the cellular phone 1, as the function of the guidance search unit, searches out the key image 60g, the character information 60b and the positional information 60c each corresponding to the event 60a, and generates, as the function of the image generation unit, the standby-image information based on the guidance information.

Figure 8A:
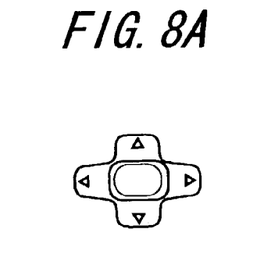
Figure 8B:
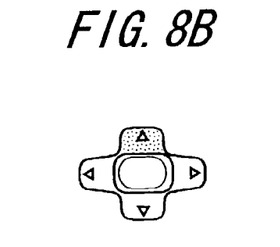
Figure 8C:
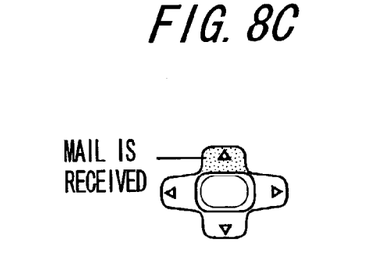
Figure 8D:
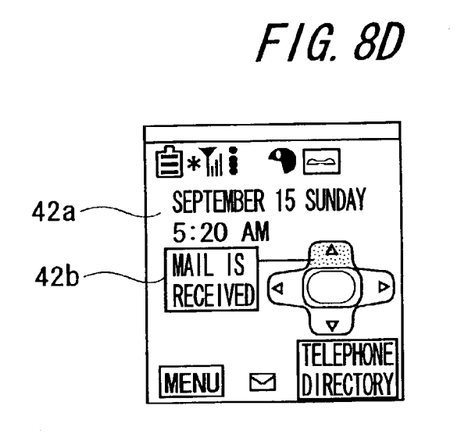

At this time, if the event is the receipt of the mail, changes a color tone of a manipulating target area as illustrated in FIG. 8(b) on the basis of the positional information (of the upper key) of the multi-key image shown in FIG. 8(a), and the character information (the mail is received) is synthesized with this position (FIG. 8(c)). Then, the standby-image containing this guidance is generated (FIG. 8(d)).

According to this modified example, the key images can be made corresponding to the plurality of events, whereby a storage capacity of the guidance storage unit can be restrained.

Further, according to this modified example, the plurality of keys are illustrated as the key images, and the manipulating target key is distinguishable by displaying it in the different color tone, thereby making it possible to indicate a positional relationship between the manipulating target key and the keys peripheral thereto, to facilitate a grasp of the key position and to enhance the operability.

What is claimed is:

1. An information processing terminal comprising:
    an event detection unit detecting an occurrence of an event based on a received data from another terminal;
    a guidance storage unit stored with pieces of guidance information corresponding to respective events;
    a guidance search unit searching out the guidance information comprising an operation conducted next corresponding to the event from said guidance storage unit;
    an image generation unit generating a standby-image corresponding to the guidance information; and
    a display control unit displaying the standby-image;
    wherein the standby image corresponding to the guidance information is displayed if the event based on the data received from another terminal occurs, and
    wherein the guidance information contains an image of the operation key operated corresponding to the event.

2. An information processing terminal according to claim 1, further comprising:
    an operation accept unit accepting an operation displayed in the guidance; and
    a process executing unit executing a process corresponding to the event when accepting the operation.

3. An information processing terminal according to claim 1, further comprising an assignment change unit changing a function assigned to an operation key in the case of displaying the guidance,
    wherein said guidance search unit searches out the guidance information indicating an operation of the operation key after changing the function.

4. An information processing terminal according to claim 1, wherein said guidance search unit searches out the guidance information of manipulation that is to be made next in corresponding to the event.

5. A storage medium readable by a computer, tangible embodying a program of instructions executable by the computer to perform method steps comprising:
    detecting an occurrence of an event based on a received data from another terminal;
    searching out guidance information comprising an operation conducted next corresponding to the event from a guidance storage unit;
    generating a standby-image corresponding to the guidance information; and
    displaying the standby-image,
    whereby the guidance is displayed in the standby-image;
    the standby image corresponding to the guidance information is displayed if the event based on the data received from another terminal occurs, and
    wherein the guidance information contains an image of the operation key operated corresponding to the event.

6. A storage medium readable by a computer, tangible embodying a program according to claim 5, further comprising:
    accepting an operation displayed in the guidance; and
    executing a process corresponding to the event when accepting the operation.

7. A storage medium readable by a computer, tangible embodying a program according to claim 5, further comprising changing a function assigned to an operation key in the case of displaying the guidance,
    wherein said search-out involves searching out the guidance information indicating an operation of the operation key after changing the function.

8. An information processing terminal guidance display method executed by an information processing terminal, comprising:
    detecting an occurrence of an event based on a received data from another terminal;
    searching out guidance information comprising an operation conducted next corresponding to the event from a guidance storage unit;
    generating a standby-image corresponding to the guidance information; and
    displaying the standby-image,
    whereby the guidance is displayed in the standby-image;
    the standby image corresponding to the guidance information is displayed if the event based on the data received from another terminal occurs, and
    wherein the guidance information contains an image of the operation key operated corresponding to the event.

9. An information processing terminal guidance display method according to claim 8, further comprising:
    accepting an operation displayed in the guidance; and
    executing a process corresponding to the event when accepting the operation.

10. An information processing terminal guidance display method according to claim 8, further comprising changing a function assigned to an operation key in the case of displaying the guidance,
    wherein said search-out involves searching out the guidance information indicating an operation of the operation key after changing the function.

* * * * *